United States Patent [19]

Jauch

[11] Patent Number: 4,998,455
[45] Date of Patent: Mar. 12, 1991

[54] AUTOMATIC LATHE FOR MACHINING WORK BARS

[76] Inventor: Kurt Jauch, Stritzling 191, 8351 Lalling, Fed. Rep. of Germany

[21] Appl. No.: 391,529
[22] PCT Filed: Nov. 8, 1988
[86] PCT No.: PCT/EP88/01011
§ 371 Date: Jul. 6, 1989
§ 102(e) Date: Jul. 6, 1989
[87] PCT Pub. No.: WO89/04227
PCT Pub. Date: May 18, 1989

[30] Foreign Application Priority Data

Nov. 9, 1987 [DE] Fed. Rep. of Germany ....... 3738059

[51] Int. Cl.$^5$ ..................... B23B 13/00; B23B 17/00
[52] U.S. Cl. ..................... 82/127; 82/130; 82/131; 82/118
[58] Field of Search ............ 82/126, 159, 904, 117, 82/118, 130, 131, 127; 112/275; 414/14, 18, 20

[56] References Cited

U.S. PATENT DOCUMENTS

| | | | |
|---|---|---|---|
| 3,875,830 | 4/1975 | Lechot | 82/126 |
| 4,080,853 | 3/1978 | Goto | 82/118 |
| 4,088,230 | 5/1978 | Doe et al. | 82/126 |
| 4,421,446 | 12/1983 | Leon et al. | 82/126 |
| 4,602,577 | 7/1986 | Kothe et al. | 112/275 |
| 4,706,351 | 11/1987 | Chuang | 82/159 |
| 4,831,785 | 5/1989 | Sigg | 82/904 |
| 4,838,136 | 6/1989 | Kress et al. | 82/131 |

Primary Examiner—William E. Terrell
Assistant Examiner—Mark A. Morris
Attorney, Agent, or Firm—Wallenstein, Wagner & Hattis, Ltd.

[57] ABSTRACT

A tool head (12) through which work bars (35) to be machined can be pushed and which is adapted to be driven in rotation is supported on a head stock (11). The head stock (11) is disposed between a rear feeding means (57) and a front chuck means (25). The rear feeding means (57) is designed for steadily advancing one work bar (35) at a time up to the chuck means (25) and is movable into a position ready to take up another work bar (35) before the preceding work bar (35) has been used up. The front chuck means (25) is designed to grip a portion of the work bar (35) pushed through the head stock (11) and the tool head (12) and to exert forwardly directed axial pull on the same, and it can be pushed axially back and forth by its own feed drive means (27) independently of the rear feeding means (57). That makes it possible to replace a used up work bar (35) by a new one in simple manner, in little time, and without any risk of an accident.

8 Claims, 4 Drawing Sheets

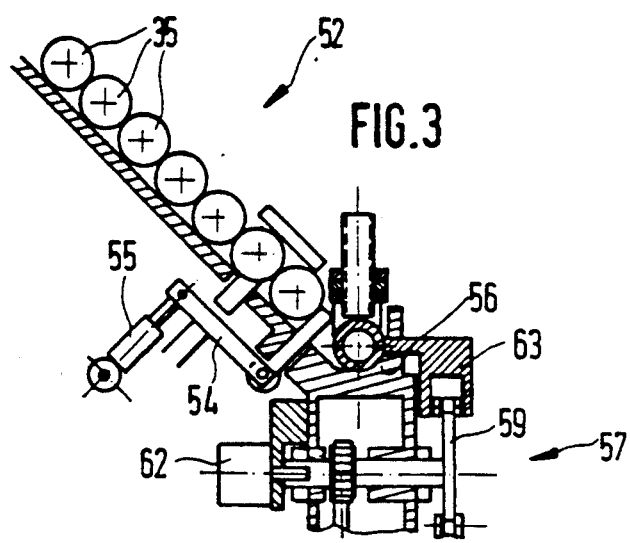
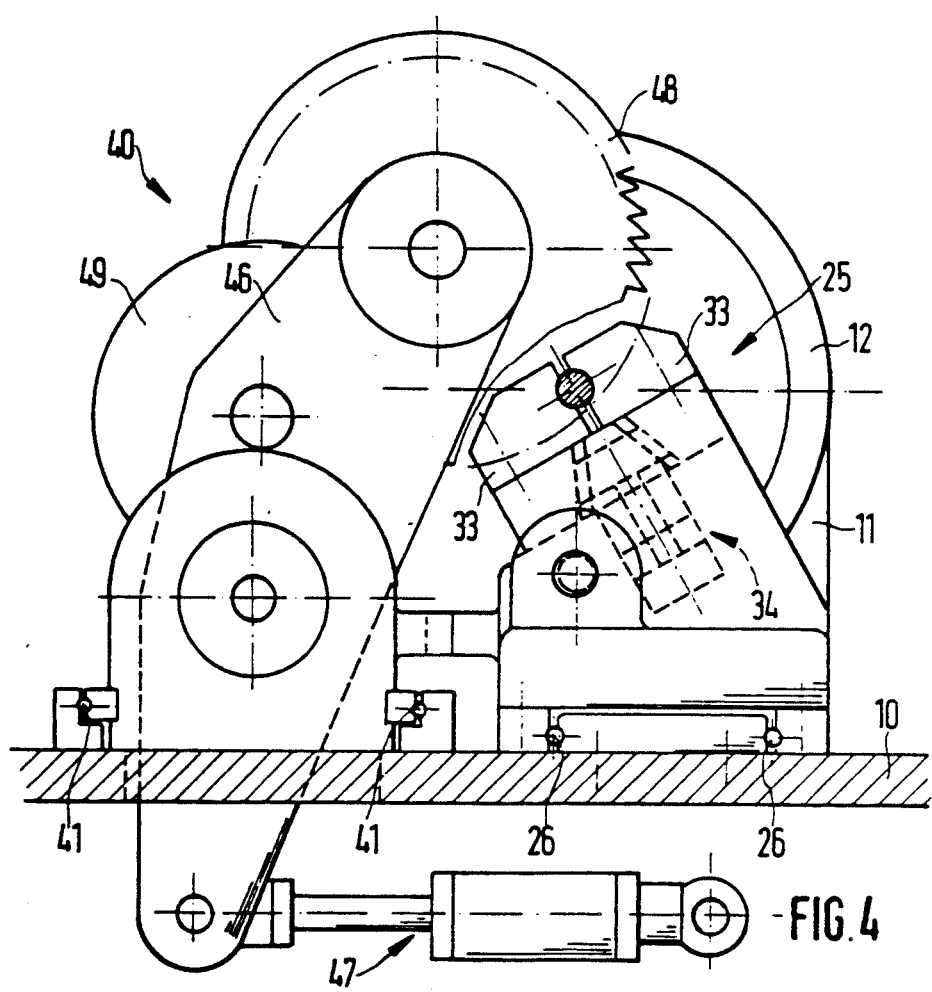

AUTOMATIC LATHE FOR MACHINING WORK BARS

The invention relates to an automatic lathe for machining work bars, comprising
a head stock which supports a tool head adapted to be driven in rotation,
a rear feeding means for axially feeding a work bar through the head stock and through the tool head,
a front chuck means movable back and forth in axial direction for gripping an area of the work bar which has been pushed through the head stock and the tool head and for exerting forwardly directed axial pull on the bar, and a severing means for cutting machined workpieces from the work bar.

A known automatic lathe of this kind (DE 12 99 482 C3) has its rear feeding means embodied substantially by a saddle which is guided on guide means for displacement in the longitudinal direction of the automatic lathe, comprises a collet chuck for gripping a work bar, and cooperates with cams which are fixed on a main control shaft of the automatic lathe. One of these cams causes axial to and fro movements of the saddle; another cam controls the collet chuck such that it will be closed on each forward movement of the saddle toward the head stock, while it is open during the return movement of the saddle. A working material holding device is arranged stationarily at the backside of the head stock, facing the feeding means, and likewise controlled by a cam fixed on the main control shaft such that it always is open during the forward movement of the feeding means, while it is closed for the return movement thereof in order to prevent the work bar from moving back together with the feeding means. A front chuck means comprising a pair of profiled jaws for gripping a machined front section of the work bar is arranged ahead of the spindle head, i.e. at the side thereof which is remote from the feeding means, likewise being mounted on an axially displaceable saddle. The saddle of the front chuck is interconnected with the saddle of the rear feeding means by a threaded rod of adjustable length for common back and forth movement in axial direction. Another threaded rod connects a circular saw, used as severing device, with the saddle of the rear feeding means.

With this known automatic lathe problems always occur when a work bar is substantially used up, leaving behind in the head stock a residual piece which must be ejected and replaced by a fresh work bar. If it is desired that the rear end of each work bar, as it passes through the rear feeding means, be followed directly by the front end of a fresh work bar that requires an additional apparatus to push the fresh material bar forward until it is grasped by the rear feeding means. If the remainder of a used up work bar is ejected in forward direction by the subsequent work bar, accidents may result. For this reason it is necessary to wait with the pushing up of a fresh work bar until the preceding one has been consumed and the rest thereof has been ejected to the rear out of the head stock.

A severing machine is known from DE 36 33 691 C1 with which work bars are cut into individual sections by a circular saw arranged in a cutting plane without having previously been subjected to any processing in the same machine. No structural groups are provided which might be comparable with a tail stock or a revolving tool head of an automatic lathe. Consequently the problem of ejecting remaining pieces out of a head stock or rotatably driven tool head does not exist. Following each cut, the circular saw is moved so far away from the work bar in radial direction that it makes room for jaws which will grasp the respective front end of the work bar. On the whole, the known machine comprises three pairs of jaws, namely one pair of stationary gripping jaws, one pair of discharging jaws, and one pair of advancing jaws. The gripping jaws are disposed upstream of the severing plane in the direction of conveyance of the work bar. The discharging jaws are disposed downstream of the severing plane and are movable to and fro in longitudinal direction of the work bar, and they hold the respective front end of material to be cut off before and while it is being cut and then move it away. The advancing jaws extend through the cutting plane when the piece of material has been severed and the circular saw withdrawn, and they now grasp the front end of the material bar so as to pull it in conveying direction through the stationary pair of gripping jaws which have been opened in the meantime. At the same time, the piece of material which has been cut off is removed in the conveying direction by the discharging jaws. The problem of discharge with an automatic lathe of the kind from which the application starts cannot be solved satisfactorily by the use of separate pairs of advancing and discharging jaws which are movable independently of each other within certain limits. This is so because tools on a revolving tool head cannot be removed so far from their working position that the risk of collision with advancing jaws penetrating across the discharging jaws into the working range of the lathe tools is excluded sufficiently reliably.

It is the object of the invention to develop an automatic lathe for the processing of work bars such that the replacement of a used-up work bar by a new one is possible in simple manner, in little time, and without a risk of accidents.

The object is met, in accordance with the invention, in an automatic lathe of the kind specified initially in that
the rear feeding means is designed for steadily advancing a work bar up to the chuck means and is movable into a position ready to receive another work bar before the preceding work bar has been used up,
the front chuck means is movable back and forth in axial direction, independently of the rear feeding means, by a feed drive means of its own,
a separate incremental position pickup is associated with the feed drive means of the front chuck means and connected to a central control unit of the automatic lathe,
a signal transmitter is arranged at the head stock to provide a signal when the rear end of the work bar being machined moves past the same, and
the central control unit is designed such that, from the provision of said signal on, the further workpieces made from the work bar are counted and a program is switched on which differs from the regular program of motions of the feed drive means of the front chuck means to pull out a remainder of the work bar as soon as the count of workpieces equals a calculated number of workpieces.

In view of the fact that the rear feeding means does not operate at intervals but instead steadily, each work bar it pushes forward can travel in one pass and in a short time through the head stock and the tool head which is adapted to be driven in rotation until it reaches the front feeding means. For this reason it does not mean losing an appreciable amount of time if one waits with the supply of a fresh work bar until the remaining piece of the preceding work bar has been pulled entirely out of the head stock and the rotatably driven tool head by the front chuck means and has been removed out of the working range of the automatic lathe. The withdrawal of the remainder is effected according to a program of its own with which a much higher motion speed is attainable than is the case when moving an entire work bar. There is no risk that the remaining piece will be propelled in an uncontrolled manner by the tool head since it is pulled out of the working range of the rotatably driven tool head. The loss of time suffered with the known automatic lathe when the remainder is ejected rearwardly out of the head stock for reasons of safety and the next work bar is not introduced until thereafter, likewise is avoided.

Advantageous further developments of the invention are covered by the subclaims.

The invention will be described further, by way of example, with reference to the accompanying drawings, in which:

FIG. 3 is the vertical section III—III of FIG. 2;

FIG. 4 is an enlarged cross section in plane IV—IV of FIG. 1; and

Figure 1:
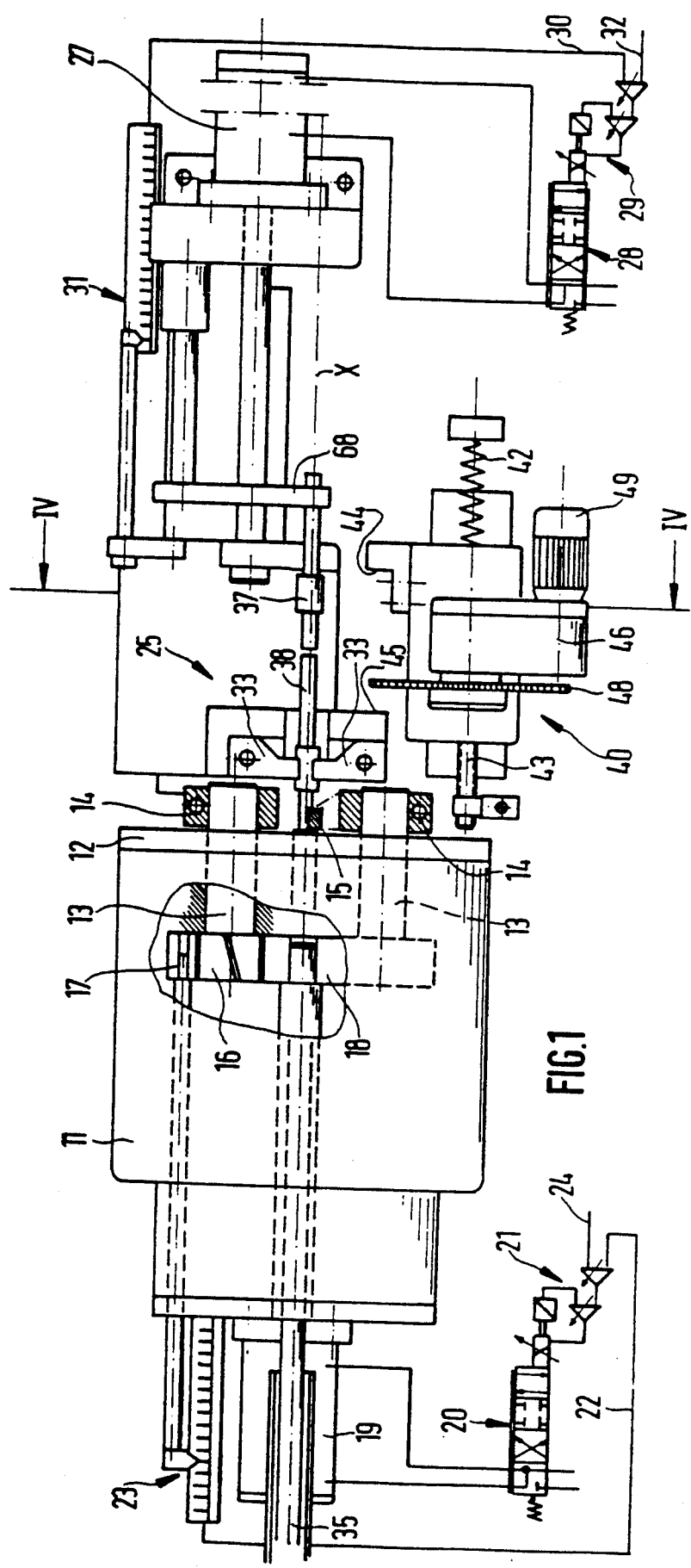
FIG. 1 is a top plan view of the central and front parts of a numerically controlled automatic lathe, partly shown in horizontal section.

The automatic lathe shown includes a lathe bed 10 on which a head stock 11 is fastened. A tool head 12 is journalled in the head stock 11 for being driven in rotation about a horizontal axis referred to below as the X axis. The drive of the tool head 12 is of conventional design and, therefore, not shown. The tool head 12 supports two shafts 13 which are disposed parallel to the X axis and diametrically opposite each other with respect to this axis. There are a pair of tool holders 14, each carrying a lathe tool 15 and fixed upon each of two shafts 13. In the example shown, the lathe tools 15 are suitable both for plunge cutting and longitudinal turning.

A pinion 16 is formed at the inner end of each of the two shafts 13 remote from the tool holder 14 and engages a tooth segment 17 with internal teeth. The tooth segments 17 are arranged inside the tool head 12 so as to revolve together with the same and be connected by a plate 18 to an hydraulic piston and cylinder unit 19. The latter is disposed at the backside of the head stock 11 and serves the purpose of displacing the tooth segments 17 in controlled fashion parallel to the X axis in order thereby to pivot the tool holders 14 so that the lathe tools 15 will carry out arcuate advancing motions to the X axis as well as corresponding retracting motions.

The piston and cylinder unit 19 is connected to a multiway valve 20 having an associated control circuit 21. The control circuit has a first input 22 connected to an incremental position pickup 23 for determining the actual position of the tooth segments 17 and a second input 24 for entering rated values from a central control unit (not shown) of the numerically controlled automatic lathe.

Ahead of the head stock 11, to the right thereof in FIG. 1, a front chuck means 25 is guided on guide means 26 which extend parallel to the X axis. A separate feed drive means 27 in the form of an hydraulic piston and cylinder unit connected to a multiway valve 28 is provided for displacement of the chuck means 25. A control circuit 29 is associated with this valve and has a first input 30 connected to an incremental position pickup 31 to determine the actual position of the chuck means 25 and a second input 32 which receives signals from the central control unit mentioned for the desired position of the chuck means 25.

The chuck means 25 includes a pair of gripping jaws 33 which are adjustable in opposite sense, radially with respect to the X axis, by means of an hydraulic piston and cylinder unit 34 so as to effect tactwise gripping of a work bar 35. The gripping jaws 33 are of such design that they can grasp an unmachined front portion 36 of the work bar 35 (FIGS. 5a and 5b) or a machined workpiece 37, while a subsequent workpiece 38 is being machined (FIGS. 5d and 5e) or a remainder 39 of the work bar 35 is being severed (FIG. 5f), as may be required.

In addition to the chuck means 25, a severing means 40 is disposed in front of the head stock 11 and is likewise displaceable parallel to the X axis on guide means 41. The severing means 40 is biased by a spring 42 in rearward direction toward an adjustable stop 43 and it has an abutment face 44 with which an engagement member 45 is associated that is formed at the chuck means 25. Consequently, the chuck means 25, when moving in forward direction, to the right in FIG. 1, can take along the severing means 40.

Figure 5A:
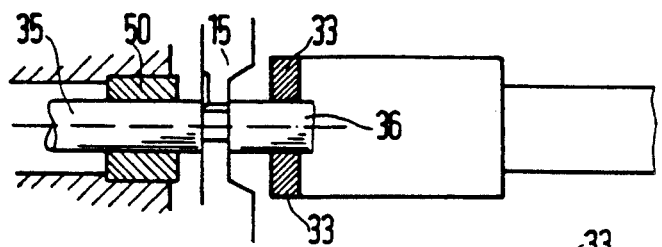
FIGS. 5a to 5f are horizontal part sectional views of the automatic lathe, showing different operating positions.
Figure 5B:
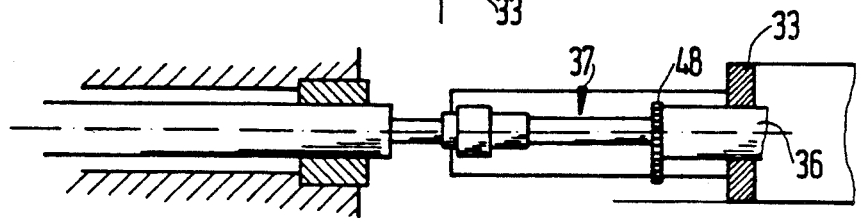
Figure 5C:
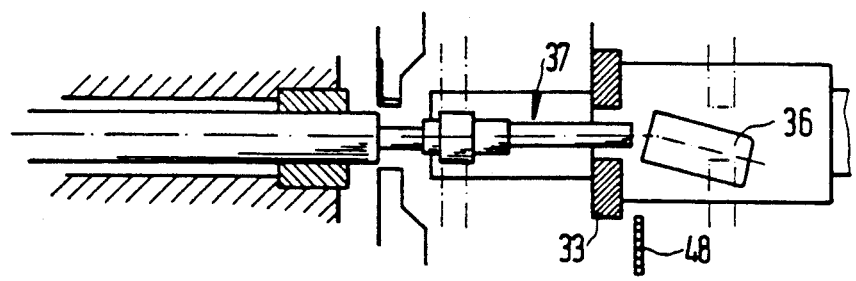
Figure 5D:
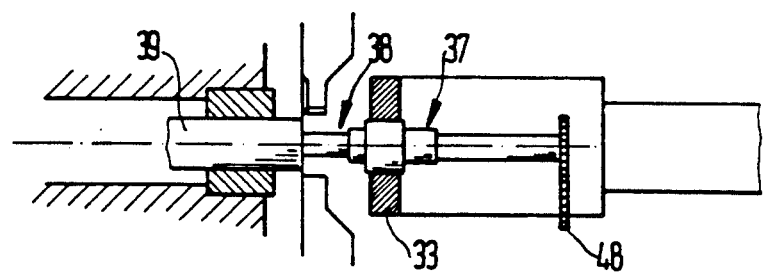
Figure 5E:
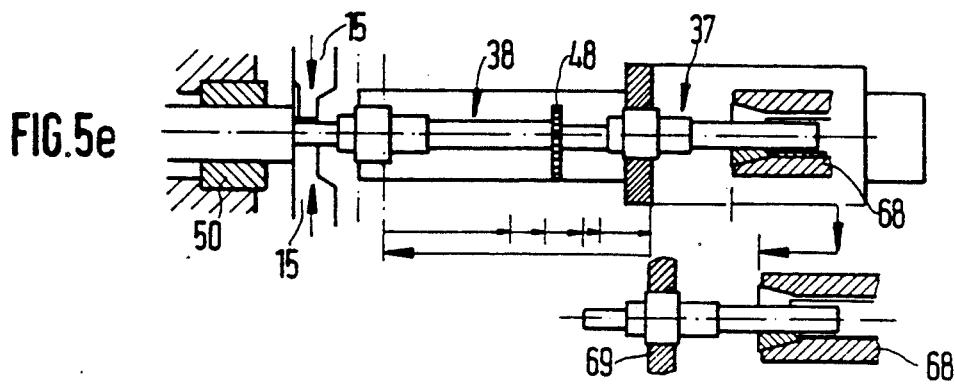
Figure 5F:
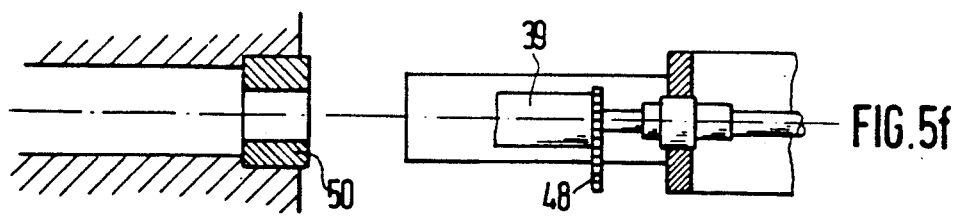

Within certain limits, however, the chuck means 25 is displaceable parallel to the X axis, independently of the severing means 40, as shown above all in FIGS. 5a to 5e. When in a rear position, as illustrated in FIGS. 1, 2, 5a, and 5d, the chuck means 25 is spaced by a very small distance from the lathe tools 15 directly in front of the tool head 12, while the severing means 40 is located further to the front, i.e. further to the right in FIGS. 1, 5a and 5d, abutting against its stop 43. The chuck means 25 is movable, out of this relative position, to the front, i.e. to the right, past the severing means 40 which does not change its position. It is only when the chuck means 25 is being displaced forwardly beyond a certain position which is fixed by adjustment of the stop 43 that it takes along the severing means 40 in forward direction, as shown in FIGS. 5b, 5e, and 5f.

The severing means 40 comprises a rocking member 46 which is pivotable about an axis parallel to the X axis by means of a piston and cylinder unit 47. A circular saw 48 is journalled on the rocking member 46 and adapted to be driven by a motor 49.

Guide bushings 50 and 51, respectively, are disposed stationarily in the front and rear ends of the head stock 11. The inner diameter of each guide bushing is adapted as closely as possible to the outer diameter of the work bars 35 to be machined. A magazine 52 of bars is arranged behind the head stock 11, and a plurality of work bars 35 are disposed one above the other in the magazine so that their front end surfaces abut against a holding edge 53. In this manner each work bar 35 is located at a defined spacing a from the position in which it is to be grasped for the first time by the chuck means 25. The magazine 52 of bars further comprises a blocking member 54 which is operable by a piston and cylinder unit 55 such that the work bars 35 roll or slide successively into a horizontal trough 56. The piston and cylinder unit 55, too, is controlled by the central control unit mentioned.

A rear feeding means 57 is arranged in the rear end region of the trough 56 remote from the head stock 11. In the embodiment shown, this feeding means comprises an endless chain 58 which runs around a drive wheel 59 and a deflector wheel 60. The drive wheel 59 is adapted to be driven by a stepping motor 61 which is controlled by the central control unit mentioned and connected to an incremental position pickup 62 for determining its actual position. A slide member 63 is fastened at the chain 58 and movable along the trough 56 in the direction of the X axis. It includes a tappet 64 which yields to the rear with respect to the slide member 63 against the resistance of a spring 65 and cooperates with a signal transmitter 66. Another signal transmitter 67 is arranged directly ahead of the rear guide bushing 51. The two signal transmitters 66 and 67 also are connected to the central control unit.

The automatic lathe described above operates as follows when used as an automatic long-turning lathe:

When work is begun, a work bar 35 enters into the trough 56 where the position of its front end surface is determined by the holding edge 53, while the position of the rear end surface is undetermined as it cannot be expected that all work bars 35 have exactly the same length. The motor 61 is switched on under program control so that the slide member 63 moves forward and its tappet 64 sooner or later hits against the rear end surface of the work bar 35 which is located in the trough 56. As the slide member 63 continues to move forward, the tappet 64 in the slide member is displaced to the rear. The resistance of the spring 65 which has to be overcome to accomplish that is smaller than the frictional resistance of the work bar 35 against displacement to the front.

Figure 2:
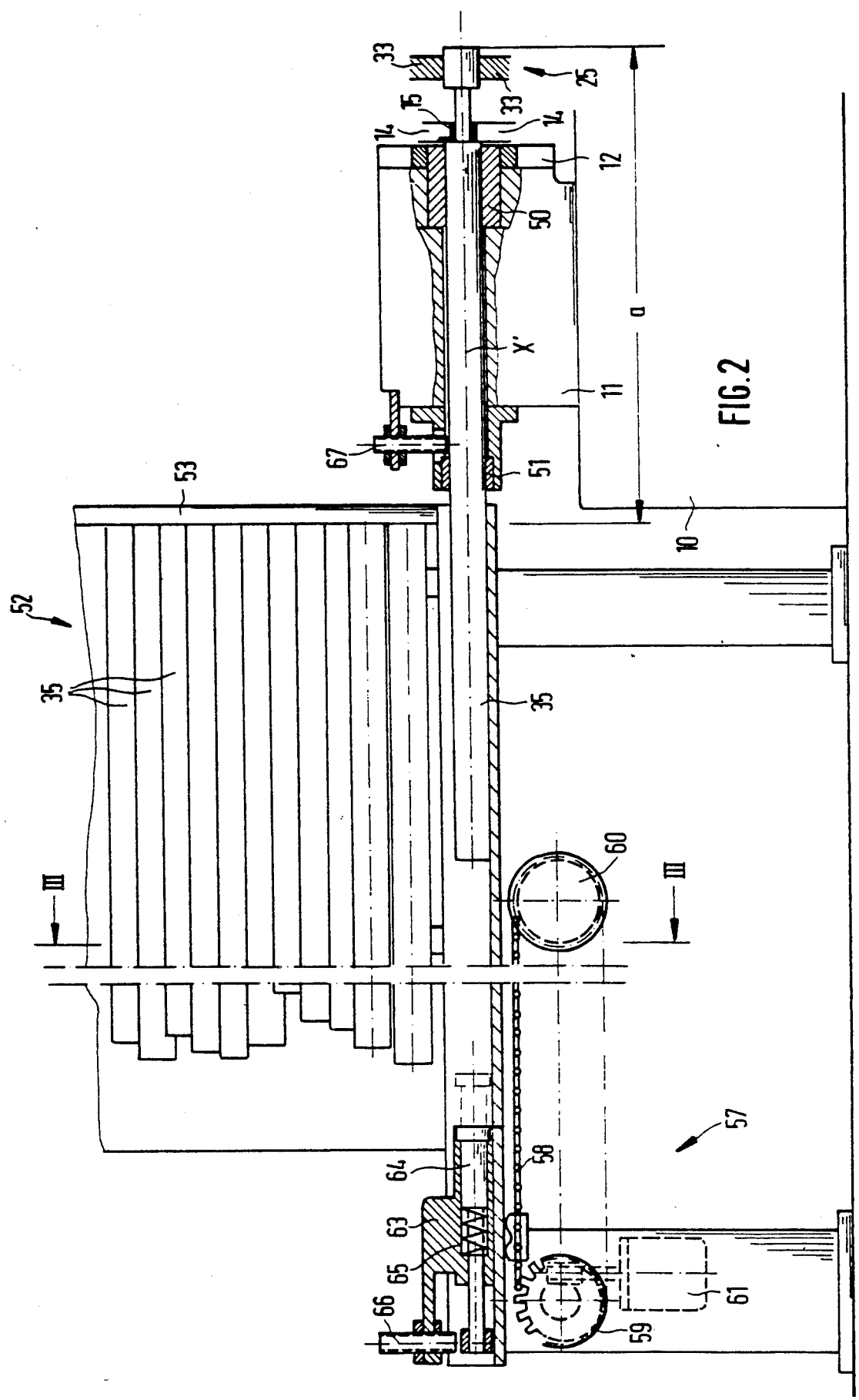
FIG. 2 is a side elevational view of the central and rear parts of the automatic lathe, partly shown in vertical section.

It is only when the tappet 64 has reached a stop in the slide member 63 that the latter can push the work bar 35 forward. As soon as the tappet 64 reaches its stop position within the slide member 63, the signal transmitter 66 emits a signal which causes the central control unit to set the incremental position pickup 62 to zero. Now it is certain that the slide member 63 must be moved on by the distance a in order for the work bar 35 to reach the position at which its front portion 36 can be grasped by the front chuck means 25 when the latter is in a given rear terminal position as shown in FIGS. 2 and 5a.

The rear feeding means 57 has completed its action on the work bar 35 positioned in the trough 56 when the unique forward motion described has been terminated, and returns to its rear terminal position Each further forward motion of the respective work bar 35 is effected solely by the front chuck means 25 pulling the work bar 35 stepwise in forward direction. During each step one or more plunge cutting or long turning operations can be carried out by the lathe tools 15.

The front portion 36 of each individual work bar 35 usually is not suited for making a workpiece and, therefore, must be cut off and ejected. The severing of the portion 36 may begin as soon as the lathe tools 15 have machined a front end part of the first actual workpiece 37, according to FIG. 5a. As the further machining of the workpiece 37 by long turning takes place, i.e. as the workpiece and the entire work bar 35 is moved on more or less steadily, this forward motion, too, is effected solely by displacement of the chuck means 25.

When the front portion 36 of the work bar 35 has travelled a certain distance during this forward motion, the chuck means 25 begins to take along the severing means 40 to the front, and the latter begins to cut the front portion 36 by means of its circular saw 48. When the first workpiece 37 has been finished and the portion 36 has been cut off from it, the chuck means 25 is returned into its starting position, the portion 36 being ejected from the chuck means 25 by the first finished workpiece 37.

The severing means 40 takes part in the forward motion of the chuck means 25 also during the long turning of each other workpiece 38, beginning to sever the previously machined workpiece 38 which still is gripped by the chuck means 25. The only thing that must be watched is that the connection between the workpieces 37 and 38, during long turning of the workpiece 38, retains a cross sectional area large enough for the chuck means 25 to transmit the traction forces required for the long turning in X direction across workpiece 37 to workpiece 38. The same applies, at the beginning of work, to the connection between the front portion 36 of the work bar 35 and the first workpiece 37 being machined.

The signal transmitter 67 emits a signal as soon as the rear end of the work bar 35 being processed has been moved through the rear guide bushing 51. This signal indicates to the central control unit that no more than a certain number of workpieces of a given length can be made from the respective work bar 35. From now on, the workpieces produced are counted, for instance on the basis of cycles of motion of the chuck means 25. When the number of workpieces counted equals the previously calculated number, the central control unit automatically switches in a special program which takes care that the chuck means 25 will move forward by a greater distance than before with each machining of a workpiece, thereby pulling the remainder 39 out of the front guide bushing 50. During this movement already, the severing means 40 begins to saw off the remainder 39 which will fall down as soon as or shortly after the chuck means 25 has reached a front terminal position, as shown in FIG. 5f.

A gripper 68 is provided, as shown in FIGS. 1 and 5e, to remove the finished workpieces 37. It is movable back and forth in the direction of the X axis and pivotable in a plane transversely thereof, and it cooperates with an additional chuck means 69. This chuck means 69 receives the workpieces 37 released by the chuck means 25 so that they may be subjected to further machining by apparatus of conventional type, not shown.

What is claimed is:

1. An automatic lathe for machining work bars responsively to control signals received from a program-steered central control unit comprising:
   a head stock (11) which supports a tool head (12) driven in rotation about the axis of a nonrotating work bar for the machining thereof;
   a rear feeding means (57) for axially feeding a work bar (35) through said head stock (11) and through said tool head (12);
   a front chuck means (25) movable back and forth in axial direction for gripping an area of said work bar (35) which has been pushed through said head stock (11) and said tool head (12) and including means for imparting forwardly directed axial motion to said bar;
   severing means (40) for cutting machined work pieces (37) from said work bar (34);

means associated with said rear feeding means for steadily advancing a work bar (35) up to said chuck means (25) and being movable by said control unit into a retracted position ready to receive another work bar (35) before the preceding work bar (35) has been used up, said front chuck means (25) being movable back and forth in axial direction, independently of said rear feeding means (57);

front chuck feed drive means (27) for moving said front chuck in said axial direction;

front chuck position pickup means (31) associated with said front chuck feed drive means (27) for providing to said central control unit a sensing signal indicative of the position of said front chuck means, first sensing means (67) associated with said head stock for providing a first control signal when the rear end of the work bar (35) being machined moves past said first sensing means, and said central control unit includes means responsive to provision of said first control signal for counting the number of additional work pieces (37) made from said work bar (35) and for switching to a program which differs from the regular program of motions of said feed drive means (27) of said front chuck means (25) to pull out the remainder (39) of said work bar (35) as soon as the count of work pieces equals a calculated number of work pieces.

2. The automatic lathe as claimed in claim 1, characterized in that said central control unit includes means for operating said rear feeding means (57) to return to its retracted position ready for receipt of another work bar (35) as soon as the preceding work bar (35) has been gripped for the first time by said front chuck means (25) responsively to commands from central control unit.

3. The automatic lathe as claimed in claim 2 including rear feeding means sensing means (62) for providing to said central control unit a control signal indicative of the position of said rear feeding means, magazine means (52) for aligningly receiving a plurality of said bars with their forward ends aligned, trough means (56) for receiving one work bar (35) at a time from said magazine means, a slide member (63) associated with said rear feeding means and movable along said trough means to feed said work bars forward, and contact-indicating signal transmitter means (66) for providing a contact-indicating signal to said central control unit responsively to engagement of said slide member with the rear end of a work bar in said trough means, and said central control unit including means responsive to receipt of said contact-indicating signal and the value of said control signal indicative of the position of said rear feeding means at that time for governing the advance of said bar into said front chuck means according to the known dimensions of said lathe from the point of alignment of said magazine means to said front chuck means.

4. The automatic lathe as claimed in claim 3 including means for mounting said severing means for movement along said axis, biasing means for biasing said severing means in a rearward direction opposite to the feeding direction of said rear feeding means, an adjustable rear stop for limiting said rearward motion, and, and an engagement member (45) carried with said front chuck means for engagingly moving said severing means towards the front.

5. The automatic lathe as claimed in claim 4 wherein said front chuck means (25) is mounted for axial movement back and forth between a rear position directly ahead of said tool head (12) to grip either of a unmachined portion (36) of said work bar (35) and a machined workpiece (37) still connected to the work bar (35), and a front position directly ahead of said severing means (40) to release either of the unmachined portion (36) and the machined workpiece (37) when it has been cut from the work bar (35).

6. The automatic lathe as claimed in claim 1 including rear feeding means sensing means (62) for providing to said central control unit a control signal indicative of the position of said rear feeding means, magazine means (52) for aligningly receiving a plurality of said bars with their forward ends aligned, trough means (56) for receiving one work bar (35) at a time from said magazine means, a slide member (63) associated with said rear feeding means and movable along said trough means to feed said work bars forward, and contact-indicating signal transmitter means (66) for providing a contact-indicating signal to said central control unit responsively to engagement of said slide member with the rear end of a work bar in said trough means, and said central control unit including means responsive to receipt of said contact-indicating signal and the value of said control signal indicative of the position of said rear feeding means at that time for governing the advance of said bar into said front chuck means according to the known dimensions of said lathe from the point of alignment of said magazine means to said front chuck means.

7. The automatic lathe as claimed in claim 1 including means for mounting said severing means for movement along said axis, biasing means for biasing said severing means in a rearward direction opposite to the feeding direction of said rear feeding means, an adjustable rear stop for limiting said rearward motion, and, and an engagement member (45) carried with said front chuck means for engagingly moving said severing means towards the front.

8. The automatic lathe as claimed in claim 1 wherein said front chuck means (25) is mounted for axial movement back and forth between a rear position directly ahead of said tool head (12) to grip either of a unmachined portion (36) of said work bar (35) and a machined workpiece (37) still connected to the work bar (35), and a front position directly ahead of said severing means (40) to release either of the unmachined portion (36) and the machined workpiece (37) when it has been cut from the work bar (35).

* * * * *